United States Patent

Tai

(10) Patent No.: US 12,446,127 B2
(45) Date of Patent: Oct. 14, 2025

(54) COLOR TEMPERATURE CONTROL LIGHTING FIXTURE

(71) Applicant: BRIGHTNESS OPTRONICS CO., LTD., Taoyuan (TW)

(72) Inventor: Shih Neng Tai, Taoyuan (TW)

(73) Assignee: Brightness Optronics Co., Ltd., Taoyuan (TW)

( * ) Notice: Subject to any disclaimer, the term of this patent is extended or adjusted under 35 U.S.C. 154(b) by 140 days.

(21) Appl. No.: 18/390,375

(22) Filed: Dec. 20, 2023

(65) Prior Publication Data

US 2025/0212300 A1  Jun. 26, 2025

(51) Int. Cl.
*H05B 45/20* (2020.01)
*H05B 45/10* (2020.01)
*H05B 45/325* (2020.01)

(52) U.S. Cl.
CPC .......... *H05B 45/20* (2020.01); *H05B 45/10* (2020.01); *H05B 45/325* (2020.01)

(58) Field of Classification Search
CPC ....... H05B 45/20; H05B 45/10; H05B 45/325
See application file for complete search history.

(56) References Cited

U.S. PATENT DOCUMENTS

| 2014/0062313 A1* | 3/2014 | Ootsubo | H05B 45/22 315/307 |
| 2016/0088697 A1* | 3/2016 | Yan | H05B 45/10 315/307 |

FOREIGN PATENT DOCUMENTS

| DE | 102022126500 B4 * | 11/2023 | H05B 45/10 |
| JP | 2018010820 A * | 1/2018 | |

\* cited by examiner

*Primary Examiner* — Abdullah A Riyami
*Assistant Examiner* — Syed M Kaiser
(74) *Attorney, Agent, or Firm* — Rosenberg, Klein & Lee

(57) ABSTRACT

A color temperature control lighting fixture includes a first and a second light-emitting component with different color temperatures, the light-emitting components each respectively connected to a first and a second connection terminal of a color temperature control module. The color temperature control module is also connected to a conduction control terminal of a dimming drive module. The color temperature control module selectively conducts between the first or the second connection terminal and the conduction control terminal, thereby switching between different color temperature light sources. The dimming drive module controls the conduction time ratio between the conduction control terminal and the ground terminal, thus controlling the total light intensity of the first and second light-emitting components. The circuit complexity is simplified and the cost is reduced by using the color temperature control module and a single dimming drive module which replaces the originally independent light source drive modules.

5 Claims, 4 Drawing Sheets

COLOR TEMPERATURE CONTROL LIGHTING FIXTURE

BACKGROUND OF THE INVENTION

1. Field of the Invention

The present invention relates to a lighting fixture, and more particularly to a color temperature controllable lighting fixture.

2. Description of the Related Art

A lighting fixture with color temperature control typically includes at least two LED modules capable of producing light of different color temperatures. The different color temperatures and emission intensities of the lighting fixture are achieved by controlling the emission intensity ratios of each LED module separately.

With reference to FIG. 4, a conventional lighting fixture with color temperature control includes a master control module 60, a first LED module 71, and a second LED module 72. The first LED module 71 and the second LED module 72 are electrically connected to the master control module 60. The first LED module 71 consists of a first LED component 712 and a first driving circuit 711. The first driving circuit 711 is connected to the master control module 60 to receive a first control signal and produces a first pulse-width modulation signal PWM1 to drive the first LED component 712 accordingly. The structure of the second LED module 72 is similar to that of the first LED module 71, including a second LED component 722 and a second driving circuit 721. The second driving circuit 721 is connected to the master control module 60 to receive a second control signal and produces a second pulse-width modulation signal PWM2 to drive the second LED component 722 accordingly.

In summary, the first LED module 71 and the second LED module 72 have the same circuit composition. They are controlled separately by two driving control signals generated by the master control module 60 to adjust the LED's emission intensity. In other words, two sets of independent driving circuits are used to drive the LED components, thereby producing light of specified color temperature and intensity.

The aforementioned lighting fixture with color temperature control has multiple independent driving circuits to control the LED components separately. This means that there will be multiple driving chips corresponding to the number of LED modules, leading to a more complex circuit and higher cost. Therefore, existing lighting fixture with color temperature control function needs further improvement.

SUMMARY OF THE INVENTION

An objective of the present invention is to provide a color temperature control lighting fixture with less circuit complexity and lower cost.

To achieve the foregoing objective, the color temperature control lighting fixture of the present invention includes:
a power module, having a power supply terminal;
a master control module, having a dimming control terminal to output a dimming control signal, and having a color temperature control terminal to output a color temperature control signal;
a dimming drive module, having a conduction control terminal connected to the dimming control terminal to receive the dimming control signal;
a color temperature control module, connected to the color temperature control terminal to receive the color temperature control signal, having a first connection terminal and a second connection terminal;
a first light-emitting component, connected to the power supply terminal and the first connection terminal;
a second light-emitting component, connected to the power supply terminal and the second connection terminal, wherein the color temperature of the first light-emitting component differs from that of the second light-emitting component;
when the color temperature control signal is a first voltage value, the color temperature control module conducts between the first connection terminal and the conduction control terminal, and cuts off between the second connection terminal and the dimming drive module;
when the color temperature control signal is a second voltage value, the color temperature control module cuts off between the first connection terminal and the conduction control terminal, and conducts between the second connection terminal and the dimming drive module;
the dimming drive module controls the conduction time ratio between the conduction control terminal and a ground terminal based on the dimming control signal.

This invention adjusts the color temperature by switching the conduction path between the first and second light-emitting components and the dimming drive module through the color temperature control module, and adjusts the overall light intensity by controlling the overall conduction time ratio of the first and the second light-emitting components through the dimming drive module, thereby achieving the dual function of adjusting the color temperature and the light intensity at the same time.

The control module generates a color temperature control signal to control the switching state of the color temperature control module. Regardless of whether the color temperature control module conducts the first or the second light-emitting component, both light-emitting components form a complete conduction path through the same circuit path of the dimming drive module. In other words, the color temperature control lighting fixture uses the color temperature control module to select the light-emitting component to be conducted, and the light-emitting components of different color temperatures are driven by the same dimming drive module.

Compared to existing lighting fixtures with color temperature switching functions that require one driving control signal and one switching signal for each corresponding LED module, the present invention switches color temperatures with single color temperature control signal and drives multiple light-emitting components with one dimming drive module. This simplifies the circuit and signals of the color temperature control lighting fixture, achieving the goal of cost saving and reducing high-frequency interference.

Other objectives, advantages and novel features of the invention will become more apparent from the following detailed description when taken in conjunction with the accompanying drawings.

DETAILED DESCRIPTION OF THE INVENTION

Figure 1:
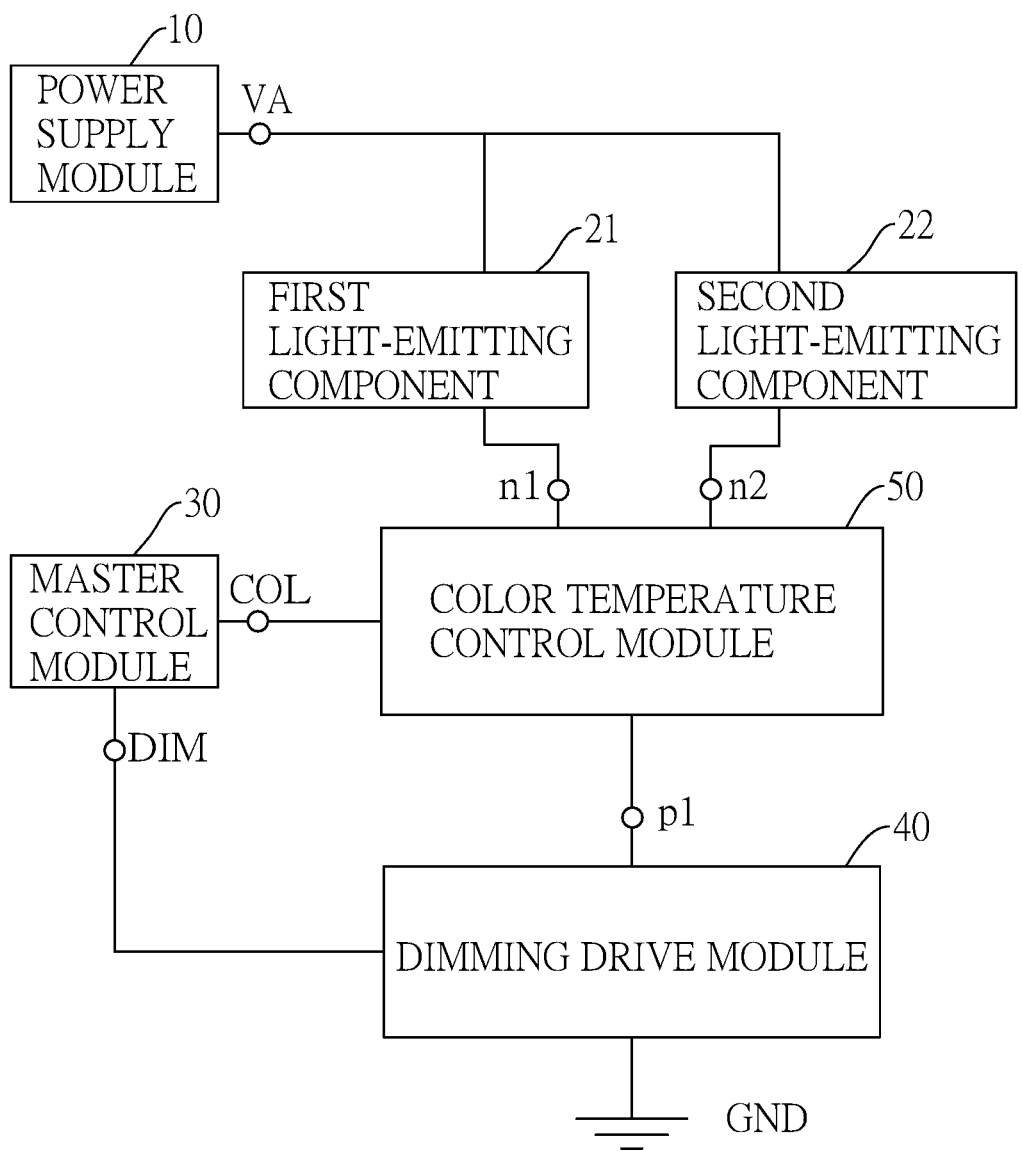
FIG. 1 is a block diagram of the circuit system of a color temperature control lighting fixture of the present invention.

With reference to FIG. 1, the color temperature control lighting fixture of the present invention includes a power supply module 10, a first light-emitting component 21, a second light-emitting component 22, a master control module 30, a dimming drive module 40, and a color temperature control module 50. The power supply module 10 receives an alternating current (AC) source and outputs a rectified direct current power supply from a power supply terminal VA. The master control module 30 has a dimming control terminal DIM to output a dimming control signal and a color temperature control terminal COL to output a color temperature control signal. The dimming drive module 40 is connected to the dimming control terminal DIM to receive the dimming control signal, and has a conduction control terminal P1. The color temperature control module 50 is connected to the color temperature control terminal COL to receive the color temperature control signal, and has a first connection terminal n1 to connect to the first light-emitting component 21, and a second connection terminal n2 to connect to the second light-emitting component 22. The first ends of both the first light-emitting component 21 and the second light-emitting component 22 are connected to the power supply terminal VA to receive the direct current power supply, the second end of the first light-emitting component 21 is connected to the first connection terminal n1, and the second end of the second light-emitting component 22 is connected to the first connection terminal n1. The color temperatures of the first light-emitting component 21 and the second light-emitting component 22 are different. Preferably, the first light-emitting component 21 and the second light-emitting component 22 are light-emitting diodes (LEDs) of different color temperatures.

The color temperature control module 50 is used to control the emission ratio of the first light-emitting component 21 and the second light-emitting component 22, thereby regulating the overall color temperature of the color temperature control lighting fixture. In one embodiment, when the color temperature control signal is a first voltage value V1, the color temperature control module 50 conducts between the first connection terminal n1 and the conduction control terminal P1 of the dimming drive module 40, and cuts off between the second connection terminal n2 and the conduction control terminal P1. Conversely, when the color temperature control signal is a second voltage value V2, the color temperature control module 50 cuts off between the first connection terminal n1 and the conduction control terminal P1 of the dimming drive module 40, and conducts between the second connection terminal n2 and the conduction control terminal P1.

When the color temperature control module 50 conducts between the first connection terminal n1 and the conduction control terminal P1, a conduction path is formed from the power supply terminal VA through the first light-emitting component 21, the first connection terminal n1, the conduction control terminal P1, and the dimming drive module 40, to the ground terminal GND. The current runs through the first light-emitting component 21, causing it to emit light. Conversely, when the color temperature control module 50 conducts between the second connection terminal n2 and the conduction control terminal P1, a conduction path is formed from the power supply terminal VA through the second light-emitting component 22, the second connection terminal n2, the conduction control terminal P1, and the dimming drive module 40, to the ground terminal GND. The current can pass through the second light-emitting component 22, causing it to emit light.

Furthermore, the dimming drive module 40 controls the conduction time ratio between the conduction control terminal P1 and the ground terminal GND according to the dimming control signal received from the master control module 30. The conduction time ratio is the duty cycle of the total conduction time of the first light-emitting component 21 and the second light-emitting component 22, by which the total light output of both light-emitting components is adjusted.

Figure 2A:
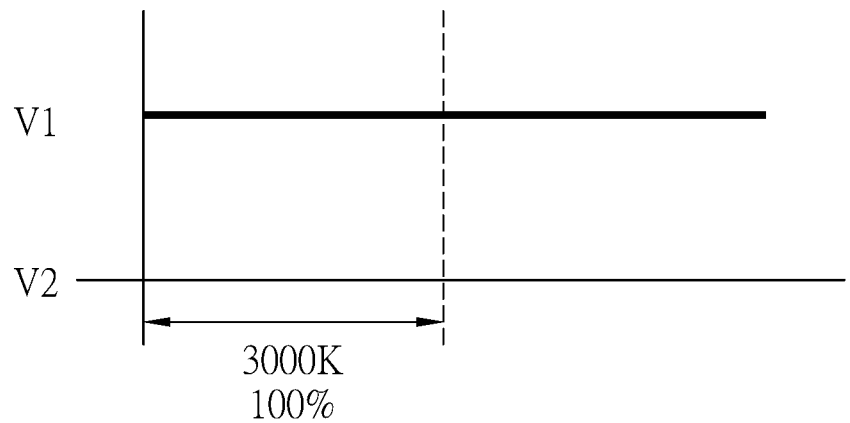
FIGS. 2A to 2C are waveform diagrams of the color temperature control signal of a color temperature control lighting fixture of the present invention.
Figure 2B:
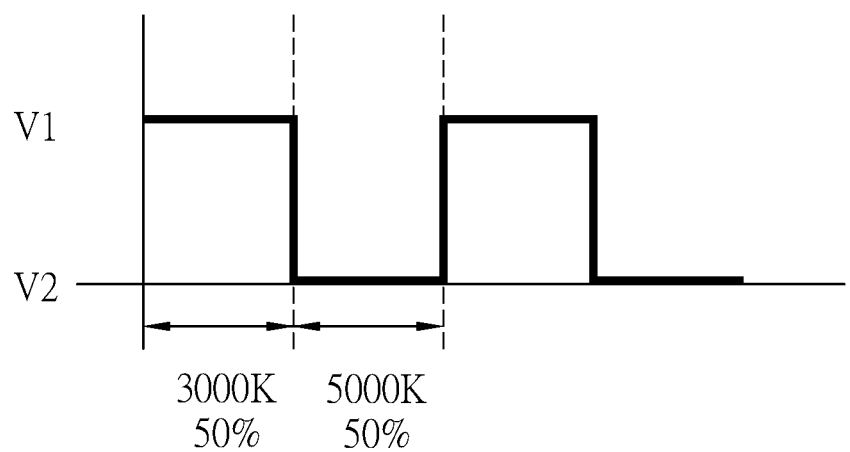
Figure 2C:
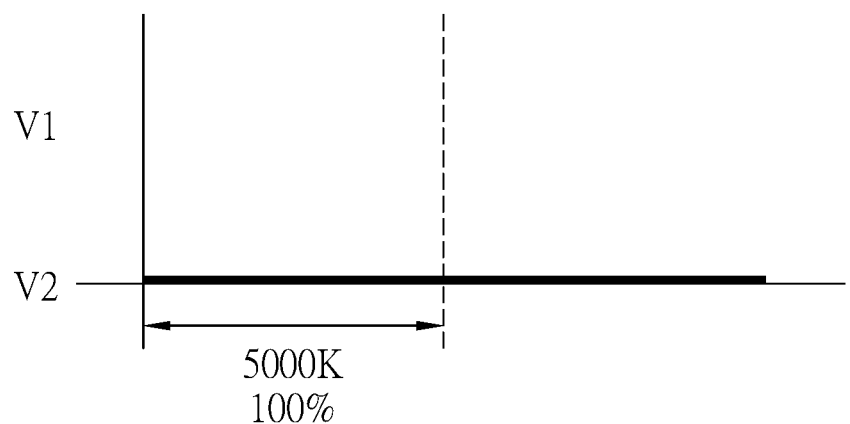

With reference also to FIGS. 2A to 2C, in one embodiment, the color temperature control signal is a Pulse Width Modulation (PWM) control signal. The color temperature control signal switches between the first voltage value V1 and the second voltage value V2 with a color temperature cycle and a time ratio. In each color temperature cycle, the time ratios of the first voltage value V1 and the second voltage value V2 add up to 100%, and their respective time ratios can range from 0% to 100%, therefore controlling the relative conduction ratio of the first light-emitting component 21 and the second light-emitting component 22, producing a mixed light with varying color temperatures to the human eye. Preferably, the frequency of the color temperature control signal is between 1 KHz and 20 KHz.

For example, the first light-emitting component 21 is an LED with a color temperature of 3000 K, and the second light-emitting component 22 is an LED with a color temperature of 5000 K. As shown in FIG. 2A, when the color temperature control signal is 100% of the first voltage value V1 during each color temperature cycle, the color temperature control module 50 conducts 100% of the time between the first connection terminal n1 and the conduction control terminal P1, producing light with 100% color temperature of 3000 K. As shown in FIG. 2B, when the color temperature control signal is 50% of the first voltage value V1 and 50% of the second voltage value V2 during each color temperature cycle, the color temperature control module 50 conducts 50% of the time between the first connection terminal n1 and the conduction control terminal P1, and also conducts 50% of the time between the second connection terminal n2 and the conduction control terminal P1, producing a mixed light of 50% color temperature 3000 K and 50% color temperature 5000 K. As shown in FIG. 2C, when the color temperature control signal is 100% of the second voltage value V2 during each color temperature cycle, the color temperature control module 50 conducts 100% of the time between the second connection terminal n2 and the conduction control terminal P1, producing light with 100% color temperature of 5000 K.

Figure 3:
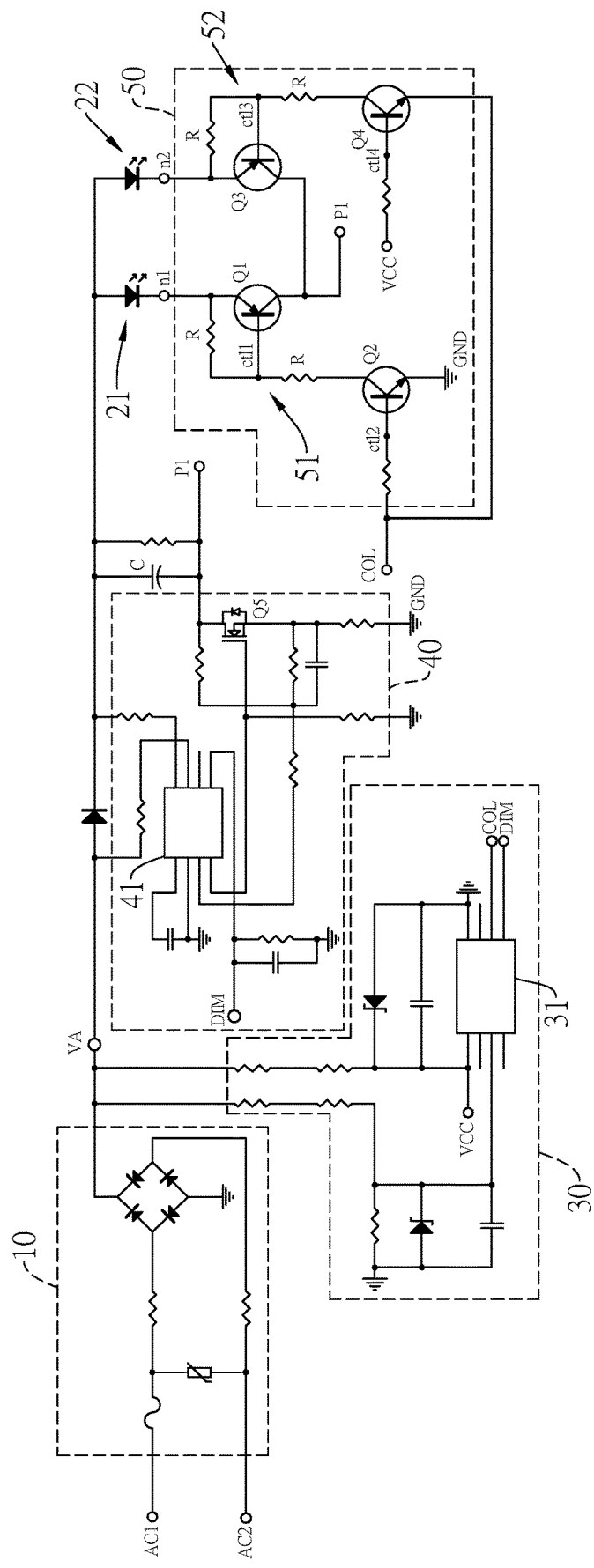
FIG. 3 is a circuit diagram of an embodiment of a color temperature control lighting fixture of the present invention.
Figure 4:
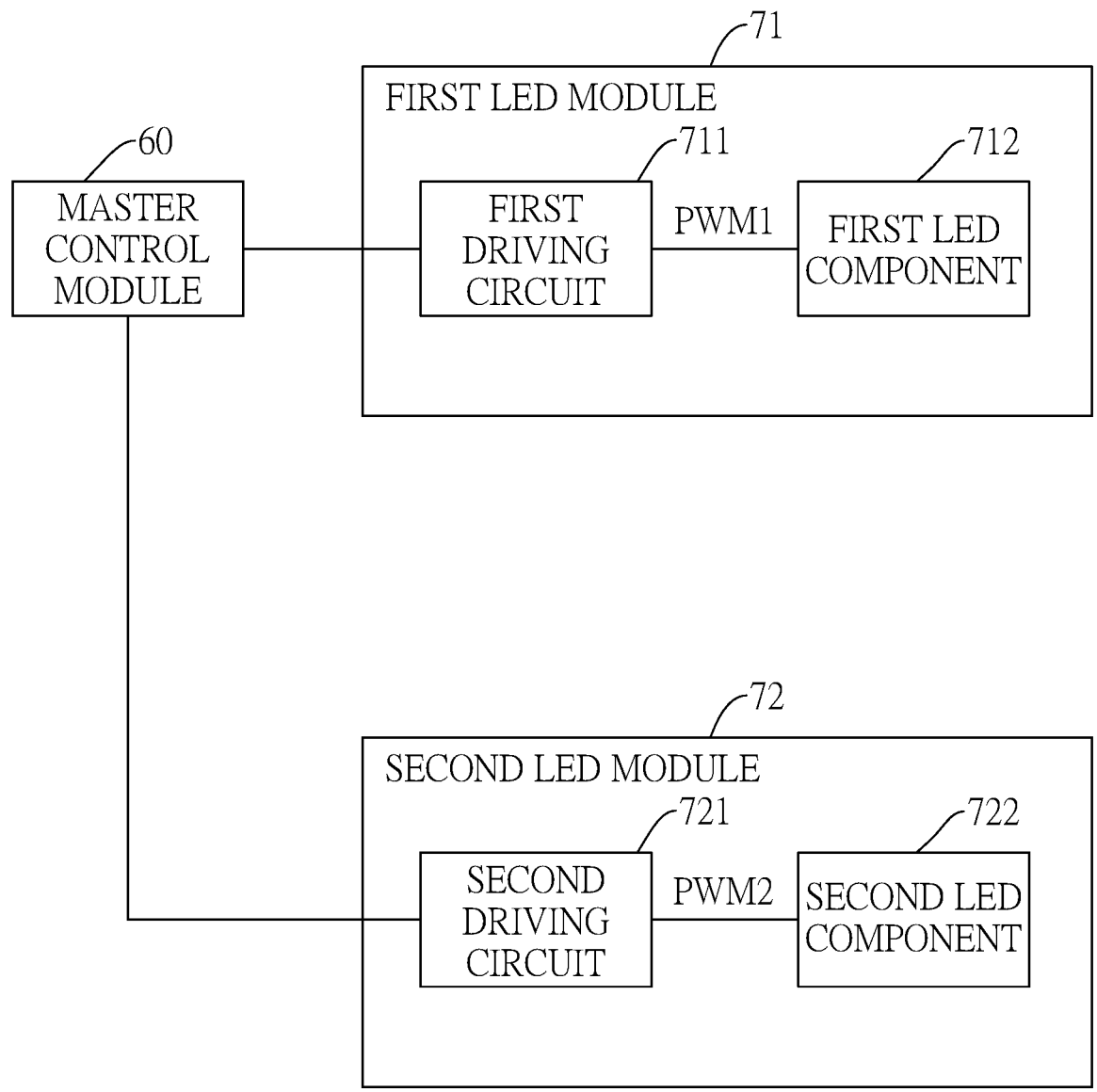
FIG. 4 is a block diagram of a conventional lighting fixture with color temperature control function.

With reference to FIG. 3, the power supply module 10 is connected to the alternating current supply ends AC1 and AC2 and includes a rectification unit. The rectification unit rectifies the alternating current received from the AC1 and AC2 supply ends into a direct current power supply, which is then provided to the power supply terminal VA.

Further with reference to FIG. 3, in an embodiment, the color temperature control module 50 includes a first voltage dividing unit 51, a second voltage dividing unit 52, a first switch Q1, a second switch Q2, a third switch Q3, and a fourth switch Q4. The first voltage dividing unit 51 has a first voltage division output terminal, and the second voltage dividing unit 52 has a second voltage division output terminal. The first switch Q1 has a first control terminal ctl1, the second switch Q2 has a second control terminal ctl2, the third switch Q3 has a third control terminal ctl3, and the fourth switch Q4 has a fourth control terminal ctl4. The first switch Q1 is connected between the first light-emitting component 21 and the conduction control terminal P1. A first end of the second switch Q2 is connected to the first connection terminal n1 through the first voltage dividing unit 51, and a second end of the second switch Q2 is connected to the ground terminal GND, while its control terminal ctl2 is connected to the color temperature control terminal COL. The third switch Q3 is connected between the second connection terminal n2 and the conduction control terminal P1. A first end of the fourth switch Q4 is connected to the second connection terminal n2 through the second voltage dividing unit 52, and a second end of the fourth switch Q4 is connected to the color temperature control terminal COL, and its control terminal ctl4 is connected to a voltage level terminal VCC of the master control module 30. The first voltage division output terminal is connected to the first control terminal ctl1, and the second voltage division output terminal is connected to the second control terminal ctl2. When the voltage difference between the first connection terminal n1 and the first control terminal ctl1 exceeds a switch threshold value, the first switch Q1 conducts; similarly, when the voltage difference between the second connection terminal n2 and the third control terminal ctl3 exceeds the switch threshold value, the second switch Q2 conducts.

Specifically, the first voltage dividing unit 51 and the second voltage dividing unit 52, for instance, each include two resistors R. In the first voltage dividing unit 51, the two resistors R are connected in series between the first connection terminal n1 and the first end of the second switch Q2, with the connection point of the resistors R being the first voltage division output terminal. In the second voltage dividing unit 52, the two resistors R are connected in series between the second connection terminal n2 and the first end of the fourth switch Q4, with the connection point of the resistors R being the second voltage division output terminal. The resistance values of these resistors R are set according to the conduction voltage of the first switch Q1 and the third switch Q3.

In this embodiment, the first voltage value V1 is equal to the voltage of the voltage level terminal VCC, and the second voltage value V2 is equal to the voltage of the ground terminal GND.

When the color temperature control signal is the first voltage value V1, the second switch Q2 conducts, allowing current to flow through the first voltage dividing unit 51. This creates a voltage difference greater than the switch threshold value between the first connection terminal n1 and the first voltage division output terminal (first control terminal ctl1), causing the first switch Q1 to conduct and form a current path between the first connection terminal n1 and the conduction control terminal P1. The fourth switch Q4 is off, resulting in no current flowing through the second voltage dividing unit 52, no voltage difference between the second connection terminal n2 and the third control terminal ctl3, and thus the third switch Q3 is off. Consequently, there is no conduction between the second light-emitting component 22 and the conduction control terminal P1, and no current path is formed between the second light-emitting component 22 and the conduction control terminal P1 through the color temperature control module 50.

Conversely, when the color temperature control signal is the second voltage value V2, the second switch Q2 is off, preventing current from flowing through the first voltage dividing unit 51. This results in no voltage difference between the first connection terminal n1 and the first voltage division output terminal (first control terminal ctl1), causing the first switch Q1 to be off and preventing the formation of a current path between the first connection terminal n1 and the conduction control terminal P1. The fourth switch Q4 conducts, allowing current to flow through the second voltage dividing unit 52. The voltage difference between the second connection terminal n2 and the third control terminal ctl3 exceeds the switch threshold value, causing the third switch Q3 to conduct and form a current path between the second connection terminal n2 and the conduction control terminal P1.

In one embodiment, the first switch Q1 and the third switch Q3 are PNP-type Bipolar Junction Transistors (PNP-type BJTs). The emitters of the first switch Q1 and the second switch Q2 are connected to the first connection terminal n1 and the second connection terminal n2, respectively. The collectors of the first switch Q1 and the second switch Q2 are connected to the conduction control terminal P1, and the bases of the first switch Q1 and the second switch Q2 serve as the first control terminal ctl1 and the second control terminal ctl2, respectively. The second switch Q2 and the fourth switch Q4 are NPN-type Bipolar Junction Transistors (NPN-type BJTs), with their first ends being the collectors, their second ends being the emitters, and the second control terminal ctl2 and the fourth control terminal ctl4 serving as the bases, respectively.

It should be noted that the detailed circuit of the color temperature control module described in thus embodiment is only an exemplary circuit. Any circuit capable of achieving the objective of switching the conduction path between the first connection terminal n1 and the second connection terminal n2 with the conduction control terminal P1 falls within the technical scope of this invention. For instance, the previously mentioned PNP-type and NPN-type Bipolar Junction Transistors can be replaced with P-type Metal-Oxide-Semiconductor Field-Effect Transistors (PMOS) and N-type Metal-Oxide-Semiconductor Field-Effect Transistors (NMOS).

Further with reference to FIG. 3, preferably, the dimming drive module 40 includes a dimming switch Q5 and a dimming controller 41. The dimming switch Q5 is connected between the conduction control terminal P1 and the ground terminal GND. The dimming controller 41 is connected to the dimming control terminal DIM to receive the dimming control signal and controls the conduction time ratio of the dimming switch Q5 based on the dimming control signal. The dimming control signal, for example, is a variable voltage value, and the dimming controller 41 controls the conduction time ratio of the dimming switch Q5 using the PWM method. The switching frequency of the dimming switch Q5 is preferably between 1 kilohertz (KHz) and 100 KHz. The dimming controller 41, for example, is an ORG6612 dimming chip.

Further with reference to FIG. 3, preferably, the master control module 30 includes a processor 31, which has a dimming control terminal DIM and a color temperature control terminal COL. The processor 31, for example, generates the dimming control signal and the color temperature control signal based on an external controller (not shown in the figure). In a preferred embodiment, the direct current power supply of the power supply module includes a dimming power signal, and the processor 31 generates the dimming control signal and the color temperature control signal based on the dimming power signal, thus eliminating the need for an additional signal line connection to an external controller. The processor 31, for example, is an NY8A050D microprocessor.

Further with reference to FIG. 3, in one embodiment, the color temperature control lighting fixture further includes a capacitor C, connected between the power supply terminal VA and the conduction control terminal P1. In this embodiment, the first light-emitting component 21 and the second light-emitting component 22 share the same capacitor C. When the color temperature control module 50 switches between the first connection terminal n1 and the second connection terminal n2, i.e., between the first light-emitting component 21 and the second light-emitting component 22, the capacitor C does not need to be recharged as in a conventional system in which light-emitting components are driven with independent driving circuits. This avoids the switching delay caused by the charging time of the capacitors when switching between different LED modules and restarting one of the LED modules.

In summary, the present invention achieves the objective of adjusting color temperature by adjusting the relative emission time ratio of the first light-emitting component 21 and the second light-emitting component 22 through the color temperature control module 50. Moreover, by connecting the dimming drive module 40 to the backend of the color temperature control module 50, it determines the overall conduction time ratio of the first light-emitting component 21 and the second light-emitting component 22 to adjust the overall light intensity. This approach simplifies the multiple complete and independent light-emitting drive modules in the conventional technologies. The present invention uses a single processor 31 and one dimming switch Q5 to accomplish both the relative emission ratio and the overall light intensity of the two light-emitting components, thereby simplifying circuit complexity and saving cost on processors.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A color temperature control lighting fixture, comprising:
   a power module, having a power supply terminal;
   a master control module, having a dimming control terminal to output a dimming control signal, and having a color temperature control terminal to output a color temperature control signal;
   a dimming drive module, having a conduction control terminal connected to the dimming control terminal to receive the dimming control signal;
   a color temperature control module, connected to the color temperature control terminal to receive the color temperature control signal, having a first connection terminal and a second connection terminal;
   a first light-emitting component, connected to the power supply terminal and the first connection terminal;
   a second light-emitting component, connected to the power supply terminal and the second connection terminal, wherein a color temperature of the first light-emitting component differs from a color temperature of the second light-emitting component;
   wherein when the color temperature control signal is a first voltage value, the color temperature control module conducts between the first connection terminal and the conduction control terminal, and cuts off between the second connection terminal and the dimming drive module; when the color temperature control signal is a second voltage value, the color temperature control module cuts off between the first connection terminal and a conduction control terminal, and conducts between the second connection terminal and the dimming drive module;
   wherein the dimming drive module controls a conduction time ratio between the conduction control terminal and a ground terminal based on the dimming control signal;
   wherein the color temperature control module comprises:
      a first voltage dividing unit, having a first voltage division output terminal;
      a second voltage dividing unit, having a second voltage division output terminal;
      a first switch, connected between the first connection terminal and the conduction control terminal, and having a first control terminal;
      a second switch, having a first end, a second end, and a second control terminal, wherein the first end is connected to the first connection terminal through the first voltage dividing unit, the second end is connected to the ground terminal, and the second control terminal is connected to the color temperature control terminal;
      a third switch, connected between the second connection terminal and the conduction control terminal, and having a third control terminal;
      a fourth switch, having a first end, a second end, and a fourth control terminal, where the first end of the fourth switch is connected to the second connection terminal through the second voltage dividing unit, the second end of the fourth switch is connected to the color temperature control terminal, and the fourth control terminal is connected to a voltage level terminal of the master control module;
   wherein the first voltage value is equal to a voltage of the voltage level terminal, and the second voltage value is equal to a voltage of the ground terminal;
   wherein the first voltage division output terminal is connected to the first control terminal, and the second voltage division output terminal is connected to the third control terminal; when a voltage difference between the first connection terminal and the first control terminal exceeds a switch threshold value, the first switch conducts; when a voltage difference between the second connection terminal and the third control terminal exceeds the switch threshold value, the third switch conducts.

2. The color temperature control lighting fixture as claimed in claim 1, wherein the color temperature control signal is a pulse width modulation (PWM) signal, and the color temperature control signal switches between the first voltage value and the second voltage value.

3. The color temperature control lighting fixture as claimed in claim 1, further comprising:
   a capacitor, connected between the power supply terminal and the conduction control terminal.

4. The color temperature control lighting fixture as claimed in claim 1, wherein the first switch and the third switch are PNP-type bipolar junction transistors (BJT), and the second switch and the fourth switch are NPN-type BJTs.

5. The color temperature control lighting fixture as claimed in claim 1, wherein the dimming control module comprises:
- a dimming switch, connected between the conduction control terminal and the ground terminal;
- a dimming controller, connected to the dimming control terminal to receive the dimming control signal, and connected to the dimming switch to control the conduction time ratio of the dimming switch according to the dimming control signal.

* * * * *